United States Patent [19]

Hecht

[11] 4,237,338

[45] Dec. 2, 1980

[54] COORDINATED COMMUNICATION SYSTEM FOR TRANSMITTING DATA AND METHOD OF OPERATING THE SAME

[75] Inventor: Siegfried Hecht, Heidelberg, Fed. Rep. of Germany

[73] Assignee: BBC Brown, Boveri & Company Limited, Baden, Switzerland

[21] Appl. No.: 20,826

[22] Filed: Mar. 15, 1979

[30] Foreign Application Priority Data

Mar. 23, 1978 [DE] Fed. Rep. of Germany ....... 2812668

[51] Int. Cl.³ .................... G08C 25/00; H04L 25/02
[52] U.S. Cl. .................................. 178/23 A; 371/32
[58] Field of Search ................. 178/23 A, 4.1 B; 340/146.1 BA, 146.1 AL, 298; 371/32, 69

[56] References Cited

U.S. PATENT DOCUMENTS

| | | | |
|---|---|---|---|
| 3,381,272 | 4/1968 | Pasini | 178/23 A |
| 3,461,238 | 8/1969 | Van Duuren et al. | 178/23 A |
| 3,641,494 | 2/1972 | Perrault et al. | 178/23 A |
| 3,979,719 | 9/1976 | Tooley et al. | 340/146.1 BA |

*Primary Examiner*—Thomas A. Robinson
*Attorney, Agent, or Firm*—Werner W. Kleeman

[57] ABSTRACT

A method of and communication system for transmitting data, such as telegrams, messages and information, from a transmitting station to a receiving station, both stations possessing transmitter and receiver sections. The data to be transmitted, such as telegrams, is provided, by means of an identification device of the transmitting station, with names from a predetermined list in a manner such that such data can be detected by an evaluation device of the receiving station and identified in its sequence. The predetermined list of names is known to the evaluation device.

4 Claims, 1 Drawing Figure

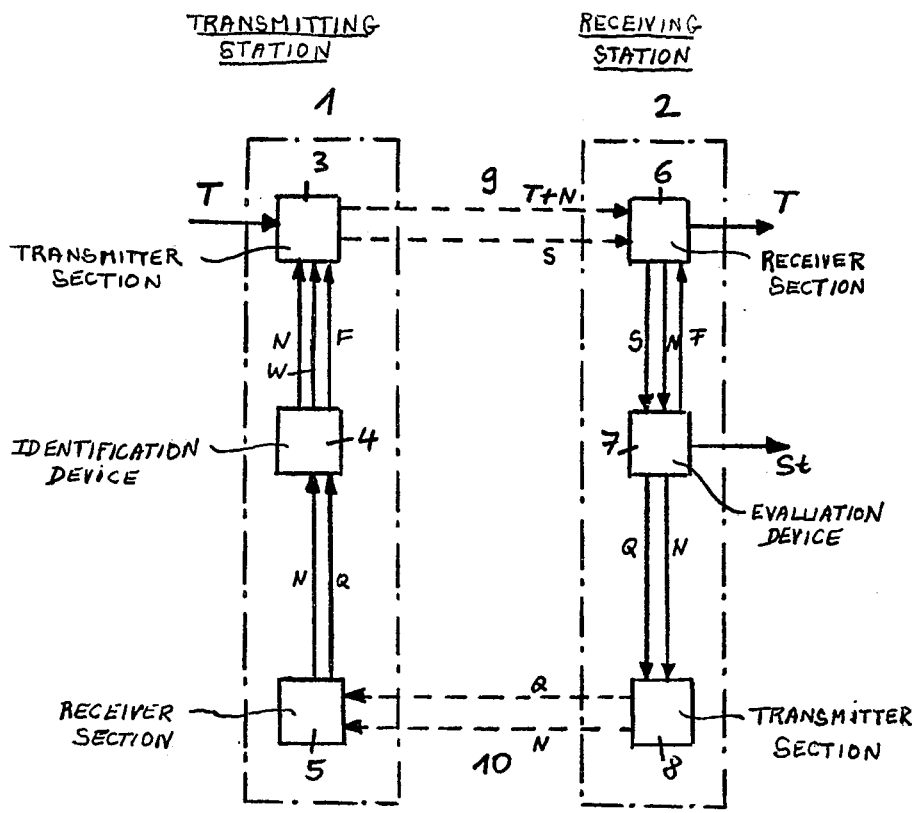

COORDINATED COMMUNICATION SYSTEM FOR TRANSMITTING DATA AND METHOD OF OPERATING THE SAME

BACKGROUND OF THE INVENTION

The present invention relates to a new and improved communication system for the transmission of data, such as telegrams, messages and information, from a transmitting station to a receiving station, both stations in each case possessing transmitter sections and receiver sections. The invention further pertains to a novel method of operating such communication system.

The inventive communication system can be used in the filed of data transmission and processing.

During the transmission of telegrams (under the expression "telegrams" there is generally meant hereinafter messages or information composed of data) it is possible that individual telegrams become lost or obliterated. In both instances the receiving station does not receive from the transmitting station any information or any useful information, as the case may be.

There are already known to the art methods wherein the transmitting or transmitter station repeats the telegram for such length of time until the receiving or receiver station confirms the proper reception of such telegram by a receipt signal. What is disadvantageous with this technique is that in the case of a telegram block (under the term "telegram block" there is to be understood a larger number of telegrams which are transmitted in succession) each individual telegram must be confirmed.

According to a further generally known method the receiver station requires a repetition of the transmitted data in the event that there has been received an obliterated or garbled telegram. What is disadvantageous with this procedure is that in the case of telegrams which have been lost there is not required any repetition and the loss of such telegram goes unnoticed.

In accordance with a third generally known technique the transmitting station, after transmitting a certain, fixed predetermined number of telegrams, requests confirmation from the receiving station that the agreed upon number of telegrams has been correctly received before there are transmitted further telegrams. However, upon loss of individual telegrams and upon reception of individually garbled telegrams it is necessary to repeat the entire telegram block.

SUMMARY OF THE INVENTION

Therefore, with the foregoing in mind it is a primary object of the present invention to provide a new and improved communication system for transmitting data and a method of operating the same, which is not associated with the aforementioned drawbacks and limitations of the prior art proposals discussed above.

Another and more specific object of the present invention aims at providing a novel communication system for transmitting telegrams, as such term has been defined in its broader sense herein, between a transmitting station to a receiving station, wherein telegrams which have become lost or garbled can be requested to be repeated in a definitive manner by the receiving station.

Now in order to implement these and still further objects of the invention, which will become more readily apparent as the description proceeds, the invention contemplates that the telegrams which are to be transmitted are provided, by means of an identification device of the transmitting station, with names from a predetermined list such that the telegrams can be detected by an evaluation device of the receiving station and identified in their sequence. The aforementioned predetermined list of names is known to the evaluation device.

Due to such individual identification or marking of the individual telegrams it is possible to advantageously individually identify each telegram.

According to a further construction of the invention the evaluation device of the receiving or receiver station, in the presence of garbled or lost telegrams, as the case may be, requests a renewed transmission of such telegram by the transmitting or transmitter station in a defined manner while identifying the aforementioned name.

Since both the identification device and the evaluation device possess the same list of names with the identical sequence, there is immediately ascertained at the receiver station whenever a telegram has been lost. It is then possible to explicitly request such lost telegram and that it be repeated by the transmitter station, whereas other, properly received telegrams advantageously need not be individually receipted or acknowledged.

According to a further embodiment of the invention the evaluation device controls the receiver station, in the event of telegrams which have arrived in an obliterated or garbled manner or have become lost, such that telegrams which have properly arrived in the meantime are not evaluated prior to arrival of the previously garbled or lost telegram.

This beneficially has the result that the desired sequence of the telegrams is precisely maintained. This constitutes an advantage since, for instance, the telegrams which have been received in the meantime could signify that there should be disregarded the information content of the older telegram which has been requested to be repeated.

A further proposal of the invention contemplates that, after transmitting a telegram block composed of a number of telegrams, a further telegram block is first then transmitted after there has been transmitted a completion or clearing signal by the transmitter station and there has been transmitted a receipt or acknowledgement signal by the receiver station.

When working with a telegram block it is therefore not necessary to individually acknowledge each individual telegram, rather it is only necessary to receipt the completed transmission of the entire telegram block. Thereafter the telegrams of the new block are identified, if desired, by using names from the already previously employed list while retaining the identical sequence. Thus, it is possible to advantageously employ the same list which, furthermore, need only consist of a small number of names. For instance, the list can comprise a supply of names composed of the sixteen tetrades of binary elements. In this case the correlation between the transmitting station and the receiving station is limited to passage of such supply of names in an ascending or descending sequence in accordance with the algorithmic formation of the sixteen tetrades.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE shows in block circuit diagram a communication system for the transmission of telegrams.

DETAILED DESCRIPTION OF THE PREFERRED EMBODIMENTS

Describing now the drawing, there is shown therein a communication system for the transmission of different types of data. In the description to follow such data has been broadly referred to as "telegrams", wherein under this last-mentioned expression there is to be generally understood different types of messages and information composed of suitable data. Such communication system will be seen to comprise a transmitter or transmitting station 1 and a receiver or receiving station 2. The transmitting station 1 embodies a transmitter section 3, an identification or marking device 4 and a receiver section 5. The receiving station 2 comprises a receiver section 6, an evaluation device 7 and a transmitter section 8.

The transmitter section 3 of the transmitting station 1 is operatively connected with the receiver section 6 of the receiving station 2 by means of a transmission path 9, whereas the transmitter section 8 of the receiving station 2 is connected with the receiver section 5 of the transmitting station 1 by means of a transmission path 10.

Within the transmitting station 1 the receiver section 5 is arranged forwardly of the identification device 4 and the latter is arranged forwardly of the transmitter section 3. Within the receiving station 2 the receiver section 6 is connected with the evaluation device 7 and the latter is arranged after the transmitter section 8.

The symbols, appearing on the drawing, for the described communication system have the following significance:

T=telegram
N=name
F=release signal
S=completion or clearing signal for a telegram block
Q= receipt signal for a telegram block
W=repeat signal
St=disturbance report signal.

There will now be explained hereinafter the mode of operation of the inventive communication system. The transmitter section 3 of the transmitting station 1 has delivered thereto, at its input side, telegrams T. These telegrams T should be delivered, by means of the transmission path 9, to the receiver section 6 of the receiving station 2. For this purpose the identification or marking device 4 of the transmitting station 1 allocates to each telegram T which is to be transmitted a name N or other appropriate identification marking or symbol from a list. The list contains individual names N in a predetermined sequence. Both the list and the sequence of the names N are known to and have been coordinated at the evaluation device 7 of the receiving station 2.

The relevant name N is incorporated in the telegram T by the transmitter section 3 for transmission purposes and transmitted to the receiver section 6. Upon arrival of the telegram T the receiving station 2 determines, by means of the evaluation device 7, the name N which has been transmitted along with the telegram T and checks such against the agreed upon list.

In the event that the transmitted name N does not coincide with the names of the list, then the evaluation device 7 determines how many names of the list for the predetermined sequence have been jumped and requests, by means of the transmitter section 8 of the receiving station 2, that the transmitting station 1 again transmit in the agreed upon sequence the lost or garbled telegrams under their identifying names N.

The information path for such request which is made by the receiving station to the transmitting station is as follows: transmitter section 8—transmission path 10—receiver section 5—identification device 4—transmitter section 3—receiver section 6. The repetition or repeat signal W is thus delivered by the identification device 4 to the transmitter section 3.

The receiver section 6 does not process the telegrams T which have been properly received in the meantime until the missing or obliterated telegram or telegrams T have arrived and been processed by the evaluation device 7, since the telegrams which have been received in the meantime could possibly signify annihilation of the information content of the earlier telegrams which have been requested to be repeated.

In the event that the name N of the telegram T which has been transmitted to the receiver section 6 coincides with the name of the next expected telegram T of the list which is known by the evaluation device 7, then the evaluation device 7 delivers a release signal F to the receiver section 6. The receiver section 6 then further transmits the received telegram T having the name N.

Only after there is present the release signal F for the telegram having the name N does the receiver section 6 process in sequence the further telegrams T of the transmitted telegram block which, in the meantime, have been received by such receiver section 6.

On the other hand, if there is missing the telegram T having the name N and if the receiving station 2 has made a request for repetition of such missing telegram to the transmitting station 1, then the receiver section 6 does not receive the release signal F for the last received telegram and stores such telegram and all subsequent telegrams in series where it has not received any release signal F. If the receiver section 6 finally receives the release signal F for a predetermined telegram T, then this telegram T constitutes the previously missing telegram and the receiver section 6 further transmits the same. The incoming release signal F furthermore constitutes for the receiver section 6 an indication that all telegrams which have been stored in the meantime are again to be processed, and specifically, in the sequence of "first in", "first out", i.e., in the sequence of their arrival.

All telegrams T which in the meantime have been received by the receiver section 6 are likewise intermediately stored and processed at the correct time of their sequence, until the receiver section 6 is again current with the incoming telegrams or the telegram block has been completed.

If the missing telegram T having the name N has still not arrived, after expiration of a certain amount of time, then the request is repeated a number of times at certain time intervals. In the event this happens without any success, then the evaluation device 7 delivers a disturbance report signal St.

The names of the list are provided in each case for a telegram block, i.e., for a larger number of telegrams, which are transmitted in succession. After transmission of a telegram block the telegrams of the next block have allocated thereto names from the same or a different list.

After transmitting the last telegram of a telegram block the identification device 4 causes the transmitter section 3 to deliver a completion or clearing signal S to the receiver section 6 of the receiving station 2. The receiver section 6 transmits this completion signal S to the evaluation device 7, which, in turn, transmits by means of its transmitter section 8 a receipt or acknowledgment signal Q to the receiver section 5 of the transmitting station 1. After this receipt signal Q has been transmitted to the identification device 4 it is possible for the next telegram block to be transmitted.

Due to the transmission of a completion or clearing signal S and the reception of a receipt or acknowledgment signal Q there is insured that the transmitting station 1 and the receiving station 2 coact in a coordinated manner at the start of the transmission of a telegram block.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A method of transmitting telegrams between a transmitting station and a receiving station, each having a transmitter section and a receiver section, comprising the steps of:
    providing at the transmitting station an identification device having a list of names for marking the transmitted telegrams;
    providing at the receiving station an evaluation device having knowledge of the list of names and their sequence for detecting and identifying such names in the transmitted telegrams;
    applying by means of the identification device of the transmitting station to the telegrams to be transmitted a respective name from said list of names;
    transmitting the telegrams with their names from the transmitting station to the receiving station;
    detecting by means of the evaluation device in the receiving station the names and their sequence in the incoming telegrams;
    requesting, upon reception at the receiving station of a telegram which is garbled or lost, by means of the receiving station, and while identifying the name of the garbled or lost telegram, the transmitting station to again transmit such telegram; and
    controlling the receiving station, by means of said evaluation device, such that telegrams which have been properly received in the interim are not evaluated until the arrival of the previously lost or garbled telegram.

2. The method as defined in claim 1, further including the steps of:
    sending the telegrams in the form of telegram blocks each composed of a number of telegrams;
    after transmitting a telegram block composed of a given number of telegrams only then transmitting a further telegram block after the transmitting station has transmitted a completion signal to the receiving station and the receiving station has transmitted a receipt signal to the transmitting station.

3. A communication system for transmitting telegrams in a telegram block between transmitting and receiving stations, wherein the transmitting station has a transmitter section having an identification device and receiver section connected at its input and the receiving station has a receiving section having an evaluation device and transmitter section connected at its output, and wherein the telegrams are provided with an identification character for checking of the correctness of the arriving telegrams, and telegrams lost or garbled upon transmission are retransmitted, comprising:
    an identical list containing the individual names for the identification of the individual telegrams of a block present at both the transmitting and receiving stations;
    individual names from said list being added to the telegrams transmitted between said stations, according to a coordinated sequence between said stations; and
    said evaluation device, after the completion of the transmission of each individual telegram, checking said individual name transmitted with each telegram, based upon said coordinated sequence, and, in the case of non-coincidence of the individual transmitted name with the name present on the list at the receiving stations, requesting retransmission of the lost or garbled telegram, by indicating its name,
    whereas simultaneously, the remaining telegrams of said block are transmitted and are intermediately stored until the arrival of said requested repetition of said lost or garbled telegram, whereupon said intermediately stored telegrams are evaluated.

4. The communication system of claim 3, wherein:
    a completion signal is transmitted between said stations upon the completed transmission of a telegram block,
    a receipt signal is then transmitted between said stations; and
    a further telegram block is transmitted between said stations after said completion and receipt signals are transmitted.

* * * * *